US011363441B2

United States Patent
Cui et al.

(10) Patent No.: US 11,363,441 B2
(45) Date of Patent: Jun. 14, 2022

(54) FACILITATING MOBILITY AS A SERVICE IN FIFTH GENERATION (5G) OR OTHER ADVANCED NETWORKS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Cedar Hill, TX (US); Paul Smith, Jr., Heath, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 324 days.

(21) Appl. No.: 16/580,326

(22) Filed: Sep. 24, 2019

(65) Prior Publication Data
US 2021/0092583 A1    Mar. 25, 2021

(51) Int. Cl.
H04W 8/02    (2009.01)
H04W 36/00   (2009.01)
H04W 8/22    (2009.01)
H04W 88/18   (2009.01)

(52) U.S. Cl.
CPC .............. *H04W 8/02* (2013.01); *H04W 8/22* (2013.01); *H04W 36/0016* (2013.01); *H04W 36/0033* (2013.01); *H04W 36/00837* (2018.08); *H04W 88/18* (2013.01)

(58) Field of Classification Search
CPC ... H04W 88/02; H04W 88/18; H04W 36/033; H04W 36/016; H04W 36/0837
See application file for complete search history.

(56) References Cited

U.S. PATENT DOCUMENTS

| | | | |
|---|---|---|---|
| 9,716,617 B1 | 7/2017 | Ahuja et al. | |
| 2002/0122403 A1* | 9/2002 | Hashem | H04W 40/02 370/342 |
| 2012/0269162 A1* | 10/2012 | Vesterinen | H04W 12/062 370/331 |
| 2013/0185408 A1* | 7/2013 | Ngo | G06F 11/2035 709/223 |
| 2014/0086103 A1 | 3/2014 | Venkatachalam | |
| 2016/0183129 A1* | 6/2016 | Liu | H04W 36/0027 370/331 |
| 2017/0171057 A1* | 6/2017 | Dong | H04L 45/02 |

(Continued)

OTHER PUBLICATIONS

Non-Final Office action received for U.S. Appl. No. 16/699,999 dated Oct. 27, 2020, 19 Pages.

(Continued)

*Primary Examiner* — Angel T Brockman
(74) *Attorney, Agent, or Firm* — Amin, Turocy & Watson, LLP

(57) ABSTRACT

Facilitating mobility as a service in advanced networks (e.g., 5G, 6G, and beyond) is provided herein. Operations of a method can comprise evaluating, by a system comprising a processor, a group of characteristics of a device. The method also can comprise enabling, by the system, a mobility management function as a mobility microservice. Further, the method can comprise activating, by the system, microservices of a group of microservices, comprising the mobility microservice, based on the group of characteristics of the device.

20 Claims, 10 Drawing Sheets

(56) References Cited

U.S. PATENT DOCUMENTS

| | | |
|---|---|---|
| 2017/0257440 A1 | 9/2017 | Barton et al. |
| 2017/0279910 A1 | 9/2017 | Maria |
| 2018/0081983 A1 | 3/2018 | Carru et al. |
| 2019/0140903 A1 | 5/2019 | Ahuja et al. |
| 2019/0215239 A1* | 7/2019 | Li .......................... G06F 8/71 |
| 2019/0238636 A1 | 8/2019 | Li et al. |
| 2019/0320038 A1 | 10/2019 | Walsh |
| 2020/0195528 A1 | 6/2020 | Barton et al. |
| 2020/0366697 A1 | 11/2020 | Vittal |
| 2020/0366733 A1 | 11/2020 | Parvataneni et al. |
| 2020/0366752 A1 | 11/2020 | White |
| 2020/0366756 A1 | 11/2020 | Vittal |
| 2020/0366758 A1 | 11/2020 | Chauhan |
| 2020/0412596 A1 | 12/2020 | Cherunni |

OTHER PUBLICATIONS

Office Action dated Jan. 25, 2021 for U.S. Appl. No. 16/666,814, 14 pages.

\* cited by examiner

FACILITATING MOBILITY AS A SERVICE IN FIFTH GENERATION (5G) OR OTHER ADVANCED NETWORKS

TECHNICAL FIELD

This disclosure relates generally to the field of mobile communications and, more specifically, to facilitating mobility management support in Fifth Generation (5G) or other advanced networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a 5G and/or Sixth Generation (6G) for wireless communications. Unique challenges exist to provide levels of service associated with forthcoming 5G, 6G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
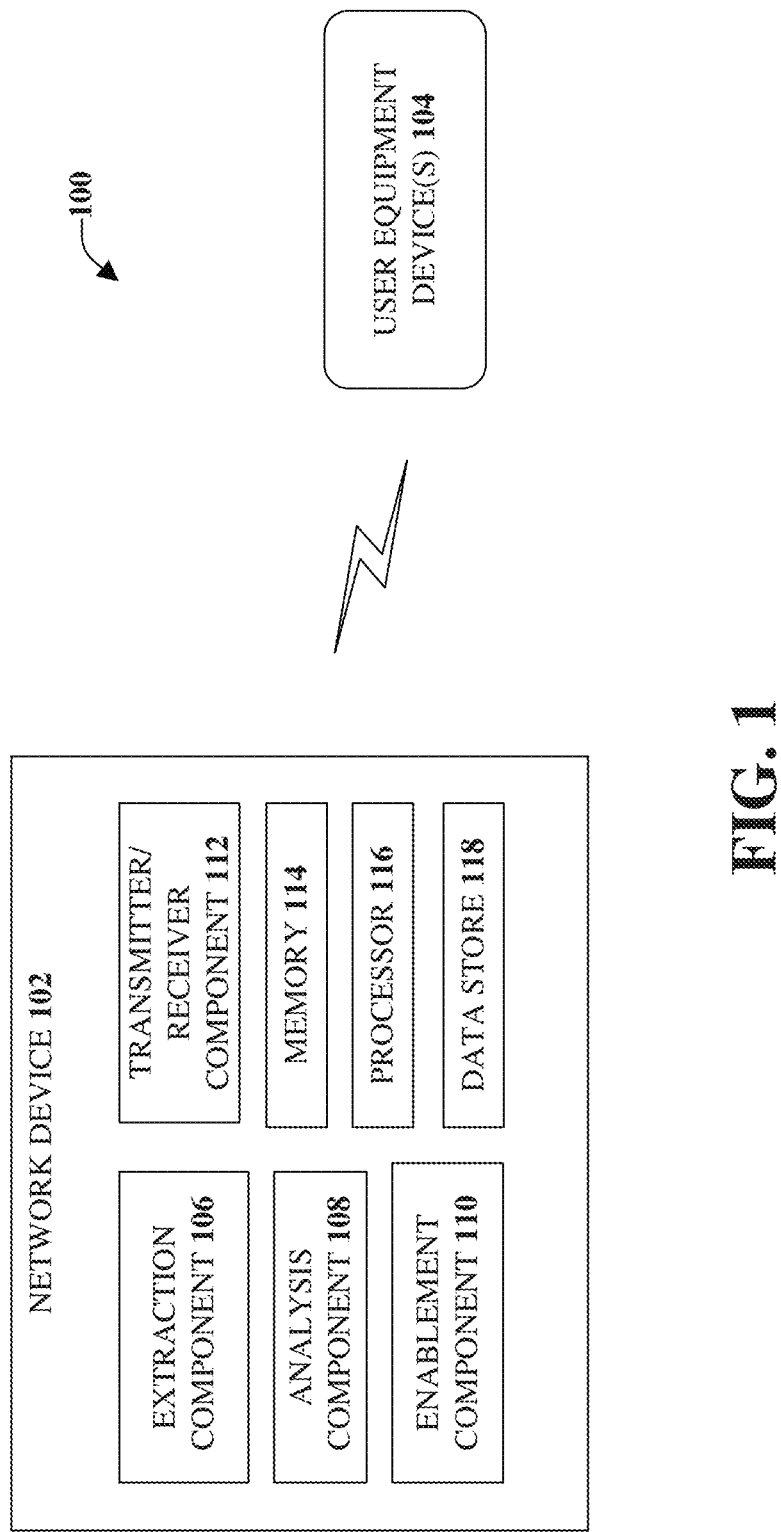
FIG. 1 illustrates an example, non-limiting, system for facilitating mobility as a service in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate selective enablement and/or non-enablement of mobility management and related microservices for devices in advanced networks. Mobility support to all devices can be very expensive. For example, for 5G, 6G, and beyond there will be many more access technologies, including satellite, that should be supported. The conventional way of providing mobility support is to provide mobility for every device across all technologies. However, with the wide-spread usage of devices, including not only mobile communication devices, but also Internet-of-Things (IoT) devices (e.g., home connectivity devices), providing mobility support to the multitude of devices will be too complex, waste network resources, and can be cost prohibitive.

Accordingly, the disclosed aspects can extract (or disable) mobility management from the wireless network and provide mobility management as a service only when needed. As discussed herein, Mobility as a Service (MaaS) can be implemented as a microservice, which provides the logic of trigger action of the mobility service (e.g., under what conditions to trigger, what mobility service(s) to trigger (which can also be implemented as microservices), and so on). The MaaS can be triggered and chained (or alternatively can be omitted) based on the policy and device context information (e.g. mobility state). A microservice is an architecture where applications are created by independent services working together. These applications can be divided into small "blocks" or microservices where each block (or microservice) supports a specific or defined function or task.

According to an embodiment, provided is a system that can comprise a processor and a memory that stores executable instructions that, when executed by the processor, facilitate performance of operations. The operations can comprise disabling a mobility management function of a wireless network. The mobility management function can be a service included in a group of services offered by the wireless network. The operations also can comprise enabling the mobility management function as the service for a device within the wireless network. Further, the operations can comprise enabling a first subgroup of microservices for the device. The first subgroup of microservices can be selected from the group of services based on a condition of the device satisfying a first condition. Alternatively, the operations can comprise enabling a second subgroup of microservices for the device. The second subgroup of microservices can be selected from the group of services based on the condition of the device satisfying a second condition.

According to an example, the first condition can comprise a stationary configuration of the device. Further to this example, enabling the first subgroup of microservices can comprise enabling a mobility management microservice and enabling a routing microservice. The device can be classified as an internet-of-things device. In another example, the stationary configuration of the device can be determined not to trigger a handover event.

In accordance with some implementations, the second condition can comprise a mobility capability and a detected movement of the device. Further to these implementations, enabling the second subgroup of microservices can comprise enabling a mobility management microservice, a session management microservice, a session internet protocol address assignment microservice, and a routing microservice. Additionally, in some implementations, the session management microservice can be configured to facilitate an association between a virtual internet protocol address and a physical internet protocol address of the device. According to some implementations, enabling the second subgroup of microservices can comprise enabling mobility management microservices for radio access technology handovers configured to facilitate movement of the device from a first access technology to a second access technology.

The second condition can comprise, according to some implementations, an expected handover of the device from a neighbor wireless network device of a neighbor network to a wireless network device of the wireless network. In some implementations, the first condition can comprise an application, which has frequent updates, executing on the device and a detected movement of the device.

In some implementations, the second condition can comprise an application, which does not update frequently, executing on the device and a detected movement of the device. Further to these implementations, enabling the second subgroup of microservices can comprise enabling the mobility management function as a microservice that comprises a mobility management microservice, and wherein a session management microservice is not enabled.

In an example, extracting the mobility management function from the wireless network can comprise offering the mobility management function as a service overlaid on a multitude of wireless networks.

Another embodiment can relate to a method that can comprise evaluating, by a system comprising a processor, a group of characteristics of a device. The method also can comprise enabling, by the system, a mobility management function as a mobility microservice. Further, the method can comprise activating, by the system, microservices of a group of microservices, including the mobility microservice, based on the group of characteristics of the device.

In accordance with some implementations, activating the microservices of the group of microservices can comprise activating a routing microservice based on a determination that the group of characteristics comprises a stationary characteristic of the device. Further to these implementations, the group of characteristics can comprise a mobility capability characteristic that indicates the device is capable of movement and a non-handover characteristic that indicates a handover event will not be triggered based on the stationary characteristic of the device. In some implementations, the stationary characteristic is a temporary condition of the device.

The group of characteristics can comprise, according to some implementations, a handover characteristic that indicates a handover event trigger. Further to these implementations, activating the microservices of the group of microservices can comprise activating, by the system, a mobility management microservice, a session management microservice, a session internet protocol address assignment microservice, and a routing microservice. Further, the method can comprise activating, by the system, mobility management microservices for radio access technology handovers configured to facilitate movement of the device from a first access technology to a second access technology. In addition, according to these implementations, the session management microservice can be configured to facilitate an association between a virtual internet protocol address and a physical internet protocol address of the device.

Another embodiment can relate to a machine-readable storage medium, comprising executable instructions that, when executed by a processor, facilitate performance of operations. The operations can comprise providing mobility management as a service based on an abstraction of the mobility management from services offered by a wireless network. The operations also can comprise determining a mobility condition of a user equipment device located within the wireless network. Further, the operations can comprise enabling a mobility microservice for the user equipment device and enabling at least a routing microservice for the user equipment device based on the mobility condition of the user equipment device.

According to some implementations, the mobility condition of the user equipment device can be a static condition that does not trigger a handover event. Thus, only the mobility microservice and the routing microservice are enabled based on the static condition.

In some implementations, the mobility condition of the user equipment device can be a mobile condition that will trigger a handover event. The operations can comprise enabling a session management microservice and a session internet protocol address assignment microservice. The operations also can comprise enabling radio access technology configured to facilitate movement of the user equipment device from a first access technology to a second access technology.

With reference initially to FIG. 1, illustrated is an example, non-limiting, system 100 for facilitating mobility as a service in advanced networks in accordance with one or more embodiments described herein. Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the system 100 can include a network device 102 and a user equipment (UE) device 104. The network device 102 can be included in a group of network devices of a wireless network. Although only one equipment device and a single network device are shown and described, the various aspects are not limited to this implementation. Instead, multiple user equipment devices and/or multiple network devices can be included in a communications system.

The network device 102 can include an extraction component 106, an analysis component 108, an enablement component 110, a transmitter/receiver component 112, at least one memory 114, at least one processor 116, and at least one data store 118. The extraction component 106 can extract mobility management from a wireless network. For example, to extract the mobility management from the wireless network, the extraction component 106 can remove or disable the mobility management from services offered by the wireless network. According to some implementations, the extraction component 106 can be configured to provide one or more instructions to the wireless network (and other wireless networks) to disable its mobility management function. Based on the extraction of the mobility management from services offered by the wireless network, the mobility management function can be provided herein as a service overlaid on a multitude of wireless networks. Further, by extracting the mobility management, the mobility management can be selectively provided as a service (e.g., provided as a service only when needed). Based on the extraction, mobility as a service can be implemented as a microservice, which can provide the logic of trigger action of the mobility service (e.g., under what conditions, which mobility service (s), and so on).

For example, mobility support to all devices can be expensive. Conventionally, mobility support is provided to all devices regardless of the device status. In an example, cellular network mobility is provided via tunnels and packet gateway anchor. In another example, WiFi/cellular mobility and service continuity is provided through a gateway and building tunnels. Since the mobility support is always on in conventional systems, this can cause burdens to the network. Further, in 5G, 6G, and other advanced networks, there can be many more access technologies, including satellite. Therefore, the conventional manner of providing mobility support for every device can be too complex.

Accordingly, as discussed herein, providing mobility to devices that are in motion, or that are expected to trigger a handover between networks, can be effective. However, providing mobility to devices that are stationary, regardless of whether the device is capable of mobility, might not be necessary. Thus, by not providing mobility support to these devices, at least temporarily in the case of devices capable of mobility, can conserve network resources. In the case of devices that are static, such as an IoT water meter (which will never move while in service), mobility support is not necessary and should be avoided.

As mentioned above, the extraction component 106 can extract mobility management from a wireless network. Mobility management can be provided by the network device 102 as a service and can be unique to each access technology. Thus, to extract the mobility management, the extraction component 106 can be configured to disable, at least temporarily, the service from the functionality of the particular access technology. According to some implementations, mobility management might not be offered as a service, or removed as a service, by the particular access technology.

The analysis component 108 can be configured to determine a condition of the UE device 104. A condition of the UE device 104 can be whether the device is static (e.g., fixed to one location), or capable of movement outside a defined range. Another condition of the UE device that can be evaluated by the analysis component 108 is whether a movement of the device is expected to trigger a handover event. For example, if the UE device 104 is a mobile phone, and the user is talking on the mobile phone in her house, although the device is capable of movement, such movement within the house is not expected to trigger a handover event and the device can be considered to be stationary or static, at least temporarily. However, if the UE device 104 is being moved through a city (e.g., located in a vehicle or is associated with a connected vehicle), it can be determined that the device movement is expected to trigger a handover event.

According to some implementations, the condition can be an application executing on the UE device 104. For example, the application can be a real-time application (e.g., checking stock quotes, participating in a web-based video conference, and so on). In another example, the application can be a non-real-time application (e.g., rendering of emails, outputting a news article on a display screen, and so on). A real-time application can be an application that has frequent updates (e.g., needs ongoing or uninterrupted network communication). A non-real-time application can be an application that does not update frequently (does not need ongoing or uninterrupted network communication (e.g., there can be some connectivity loss)).

Based on the condition of the UE device 104, the enablement component 110 can determine whether or not to enable mobility as a service for the device. For example, if the device is determined by the analysis component 108 to be in a fixed location (and will not move, such as an IoT smart water meter), the enablement component 110 can permanently disable mobility support for that device. In another example, if the analysis component 108 determines the device is capable of movement, and does move (e.g., movement is detected), other considerations can be made to determine whether mobility as a service should be enabled for the device. For example, the other considerations can be the triggering of a handover event (e.g., a handover from a first wireless network to a second wireless network, a handover from a first Radio Access Network (RAN) to a second RAN, and so forth). Another consideration can be an application (or multiple applications) executing on the UE device 104. Further considerations can include policies associated with the UE device 104, service level agreements applicable for the UE device 104, and so on.

If the device is moving, but is still considered to be stationary or static (e.g., will not trigger a handover), mobility microservices and routing microservices can be enabled for the device. Alternatively, if the device is moving and is considered to be a mobile device that is in motion (e.g., one or more handovers are expected to be triggered) mobility microservices, routing microservices, and other microservices can be enabled for the device. The other microservices can include, but are not limited to, session management microservices, session internet protocol address assignment microservices, radio access technology internet protocol address assignment microservices, and so on.

Accordingly, the system 100 can be configured to provide a flexible advanced network architecture. Also provided is a design and policy driven microservice architecture, that enables the mobility as a service to apply mobility services only when needed. Further, overall network efficiency is improved and reduced costs of operating and maintaining wireless networks can be realized through application of the disclosed aspects.

The transmitter/receiver component 112 can be configured to transmit to, and/or receive data from, the UE device 104, other network devices, and/or other UE devices.

Through the transmitter/receiver component 112, the network device 102 can concurrently transmit and receive data, can transmit and receive data at different times, or combinations thereof. According to some implementations, the transmitter/receiver component 112 can facilitate communications between the network device 102 and the UE device 104.

The at least one memory 114 can be operatively connected to the at least one processor 116. The at least one memory 114 can store executable instructions that, when executed by the at least one processor 116 can facilitate performance of operations. Further, the at least one processor 116 can be utilized to execute computer executable components stored in the at least one memory 114.

For example, the at least one memory 114 can store protocols associated with facilitating mobility as a service in advanced networks as discussed herein. Further, the at least one memory 114 can facilitate action to control communication between the network device 102, the UE device 104, other network devices, and/or other UE devices such that the network device 102 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 116 can facilitate respective analysis of information related to facilitating mobility as a service in advanced networks. The at least one processor 116 can be a processor dedicated to analyzing and/or generating information received, a processor that controls one or more components of the network device 102, and/or a processor that both analyzes and generates information received and controls one or more components of the network device 102.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 102) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 2:
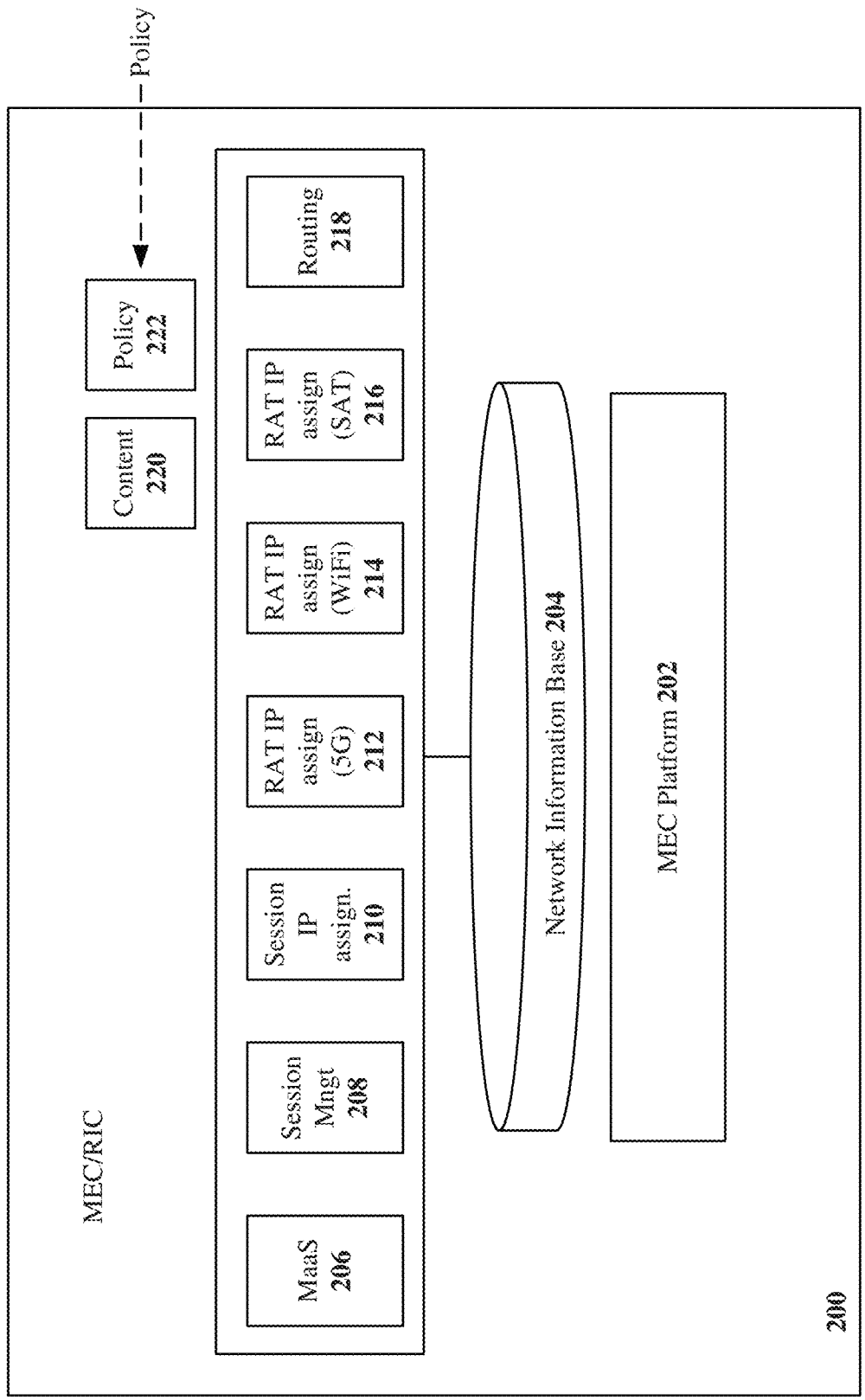
FIG. 2 illustrates an example, non-limiting, representation of a mobility as a service framework in accordance with one or more embodiments described herein.

FIG. 2 illustrates an example, non-limiting, representation of a Mobility as a Service (MaaS) framework 200 in accordance with one or more embodiments described herein. Repetitive description of like elements employed in other embodiments described herein is omitted for sake of brevity.

A Mobile Edge Computing (MEC) platform 202 (e.g., Network Function Virtualization Infrastructure (NFVI)) can be utilized to implement MaaS. Although the MaaS framework 200 is illustrated and discussed with respect to a MEC/RAN Intelligent Controller (RIC) implementation, the disclosed aspects are not limited to this implementation.

A network information base 204 can be utilized as an interface to a multitude of micro service blocks. Included in the microservice blocks are MaaS microservice 206, a session management microservice 208, a session Internet Protocol (IP) assignment microservice 210, a RAT IP assignment (5G) microservice 212, a RAT IP assign (WiFi) microservice 214, a RAT IP assign (satellite (SAT)) microservice 216, and a routing microservice 218.

One or more microservices of the microservice blocks can be instantiated based on a content 220 of a device and/or a policy 222 associated with the device. The MaaS microservice 206 can implement the logic of trigger action of the mobility service. Determinations can be made as to under what conditions to trigger one or more services and/or what mobility service(s) will be triggered. The mobility service(s) can also be implemented as microservices. The microservices can be chained or can be omitted (e.g., not implemented) based on the policy and/or the device context information.

If the device is stationary, the routing microservice can be triggered. For the stationary device, the mobility management microservice and the session management microservice are not triggered. Further, a single IP address can be assigned (when first attached) for routing purposes.

Alternatively, if the device is mobile (e.g., is in motion and expected to trigger a handover), the MaaS microservice can be triggered. Further, both virtual and physical IP addresses assignment can be triggered. There can also be session management for physical and virtual IP address association. Additionally, mobility management for I-RAT and intra-RAT handovers can decide for the device to move to different access, as needed.

Figure 3:
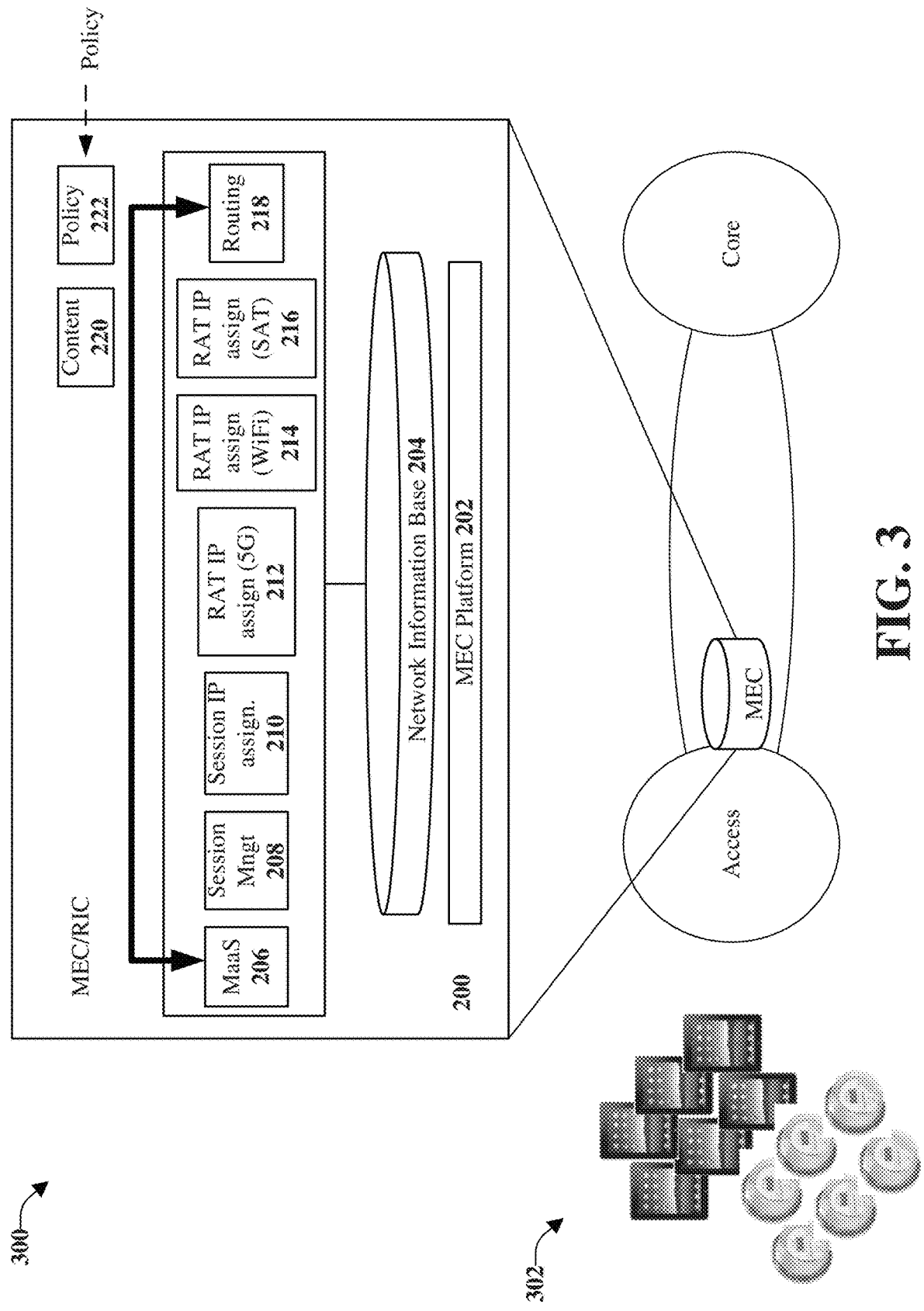
FIG. 3 illustrates an example, non-limiting, representation of a mobility as a service framework when the device is stationary in accordance with one or more embodiments described herein.

FIG. 3 illustrates an example, non-limiting, representation of a mobility as a service framework 300 when the device is stationary in accordance with one or more embodiments described herein. Repetitive description of like elements employed in other embodiments described herein is omitted for sake of brevity.

Illustrated are a multitude of devices 302 that can be considered stationary devices. In an example, a stationary device can be a device that does not move (e.g., an IoT water meter and/or another type of IoT device), that do not move during usage and are completely stationary. In another example, a device that is capable of movement can be determined to be stationary, at least temporarily. For example, as discussed, a device could be moving within a defined geographic area (e.g., within a house, an office, a department store, lobby of a hotel, and so on). Such movement might be limited such that it does not trigger a handover of the device from a first network to a second network. Therefore, the device can be considered a stationary device.

If the device is stationary, the system 100 can simply trigger the routing (e.g., the routing microservice 218) in addition to the MaaS microservice 206. In this situation, there is no session management and no mobility management. Further, a single IP is assigned (when first attach) for routing purposes. The other microservices (the session management microservice 208, the session IP assignment microservice 210, the RAT IP assignment (5G) microservice 212, the RAT IP assign (WiFi) microservice 214, and the RAT IP assign (SAT) microservice 216) do not need to be enabled or activated for a stationary device, which can conserve system resources.

Figure 4:
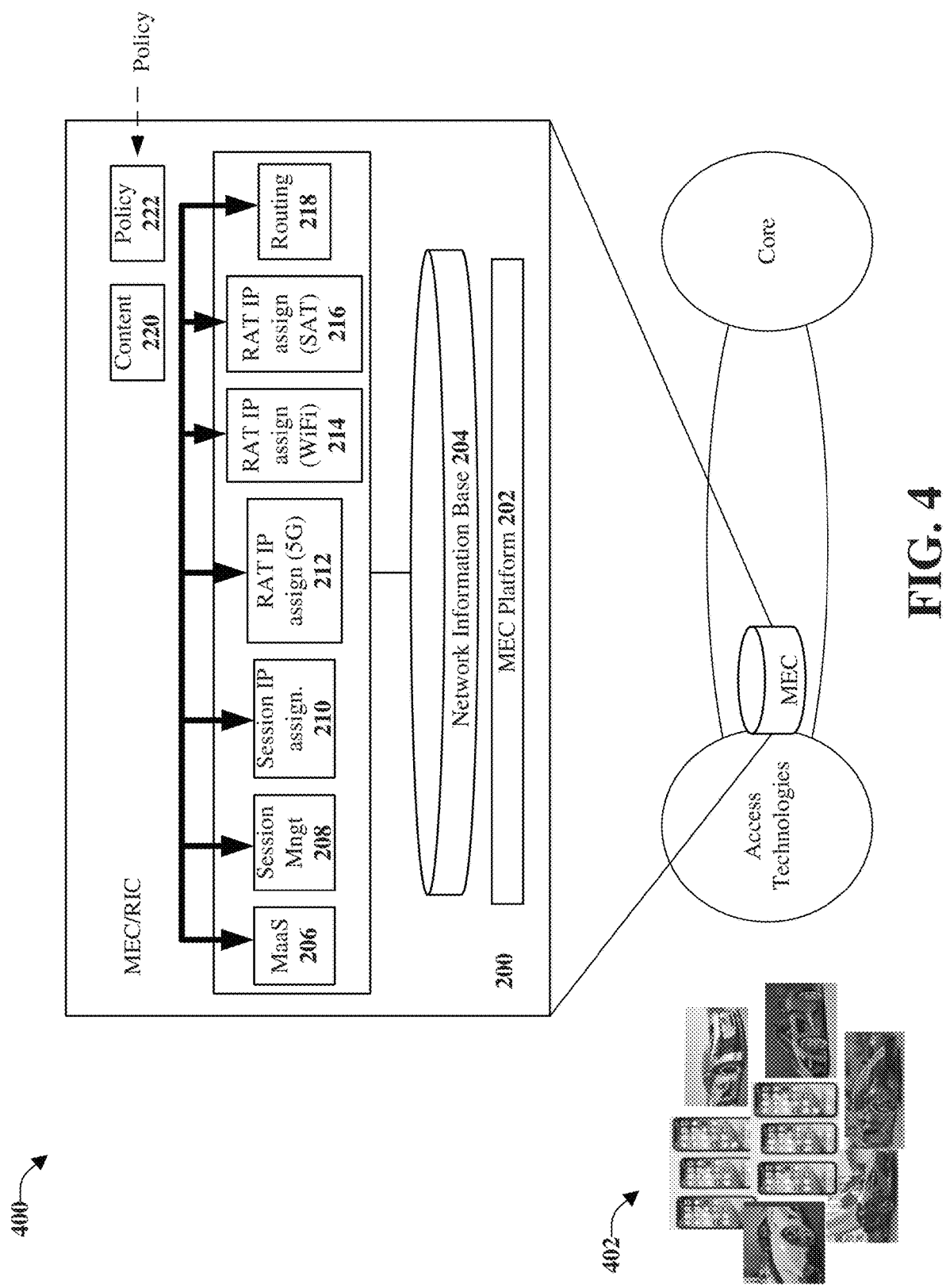
FIG. 4 illustrates an example, non-limiting, representation of a mobility as a service framework when the device is mobile in accordance with one or more embodiments described herein.

FIG. 4 illustrates an example, non-limiting, representation of a mobility as a service framework 400 when the device is mobile in accordance with one or more embodiments described herein. Repetitive description of like elements employed in other embodiments described herein is omitted for sake of brevity.

Illustrated are a group of devices that are in motion 402, such devices can include mobile communication devices, connected vehicles, and so on. As discussed herein, a device that is moving, but does not trigger a handover event, can be considered a stationary device. However, if the device is capable of movement (e.g., can be easily moved from one location to another), the stationary status of the device can be temporary. Thus, a device can be stationary at a first time and mobile (or in motion) at a second time, based on usage of the device.

If the device is mobile, the MaaS microservice triggers several microservices, including both virtual and physical IP addresses assignment, session management for physical and virtual IP address association, mobility management for I-RAT and intra-RAT HOs), etc. for the device to move to different access as needed.

Accordingly, the MaaS microservice 206 triggers the session management microservice 208, the session IP assignment microservice 210, the RAT IP assignment (5G) microservice 212, the RAT IP assign (WiFi) microservice 214, the RAT IP assign (SAT) microservice 216, and the routing microservice 218. Thus, the full suite of microservice blocks are only triggered as needed based on the movement of the device.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
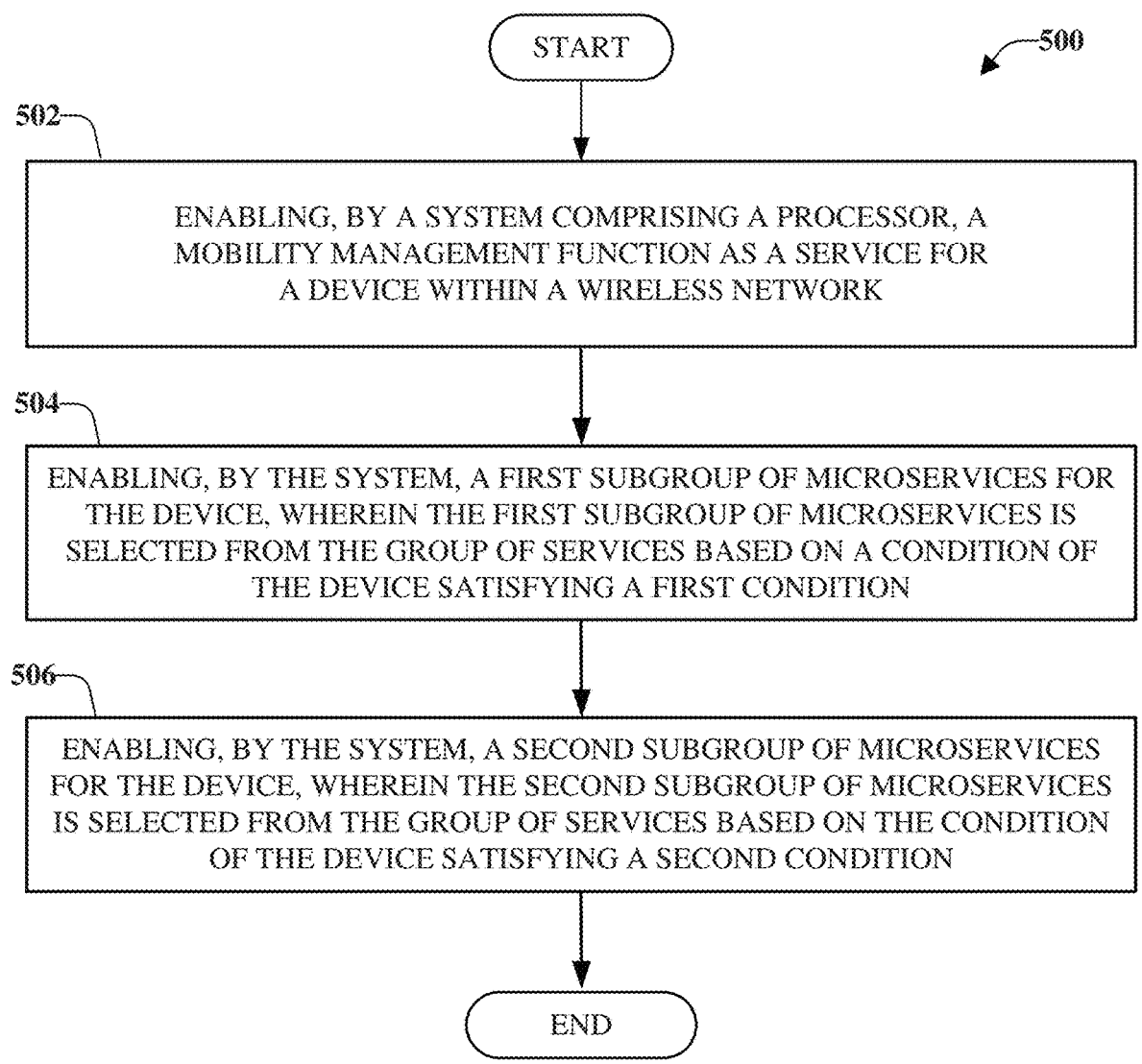
FIG. 5 illustrates a flow diagram of an example, non-limiting, computer-implemented method for facilitating mobility as a service in advanced networks in accordance with one or more embodiments described herein.

FIG. 5 illustrates a flow diagram of an example, non-limiting, computer-implemented method 500 for facilitating mobility as a service in advanced networks in accordance with one or more embodiments described herein. Repetitive description of like elements employed in other embodiments described herein is omitted for sake of brevity.

In some implementations, a system comprising a processor can perform the computer-implemented method 500 and/or other methods discussed herein. In other implementations, a device comprising a processor can perform the computer-implemented method 500 and/or other methods discussed herein. In other implementations, a machine-readable storage medium, can comprise executable instructions that, when executed by a processor, facilitate performance of operations, which can be the operations discussed with respect to the computer-implemented method 500 and/or other methods discussed herein. In further implementations, a computer readable storage device comprising executable instructions that, in response to execution, cause a system comprising a processor to perform operations, which can be operations discussed with respect to the computer-implemented method 500 and/or other methods discussed herein.

At 502 of the computer-implemented method 500, a system comprising a processor can enable a mobility management function as a service for a device within a wireless network. According to some implementations, prior to enabling the mobility management function, the system can extract the mobility management function from the wireless network. In an example, extracting the mobility management function from the wireless network can comprise offering the mobility management function as a service overlaid on a multitude of wireless networks. Further, the mobility management function can be a service included in a group of services offered by the wireless network. Upon or after extracting the mobility management function from the wireless network, the wireless network no longer provides its (siloed) mobility management function but instead utilizes the mobility management function as a service that is overlaid on the services offered by the wireless network.

At 504 of the computer-implemented method, the system can enable a first subgroup of microservices for the device. The first subgroup of microservices can be selected from the group of services based on a condition of the device satisfying a first condition. For example, the first condition can be a stationary configuration of the device. Further to this example, enabling the first subgroup of microservices can comprise enabling a mobility management microservice and enabling a routing microservice. In this case, other microservices are not enabled for the device, which can conserve resources.

The device of the above example can be classified as an internet-of-things device. Further, according to some implementations, the stationary configuration of the device can be determined not to trigger a handover event.

Alternatively, or additionally, at 506 of the computer-implemented method 500, the system can enable a second subgroup of microservices for the device. The second subgroup of microservices can be selected from the group of services based on the condition of the device satisfying a second condition. For example, the second condition can comprise a mobility capability and a detected movement of the device. Further to this example, enabling the second subgroup of microservices can comprise enabling a mobility management microservice, a session management microservice, a session internet protocol address assignment microservice, and a routing microservice. According to some implementations, the session management microservice can be configured to facilitate an association between a virtual internet protocol address and a physical internet protocol address of the device. In some implementations, enabling the second subgroup of microservices can comprise enabling mobility management microservices for radio access technology handovers configured to facilitate movement of the device from a first access technology to a second access technology.

Alternatively, or additionally, according to some implementations, the second condition can comprise an imminent or expected handover of the device from a neighbor wireless network to the wireless network. For example, the expected handover can be a handover that is determined to be more likely than not to occur. In accordance with some implementations, the first condition can comprise a real-time application (e.g., an application that has frequent or (nearly) ongoing updates) executing on the device and a detected movement of the device.

According to some implementations, the second condition can comprise a non-real-time application (e.g., and application that does not update often) executing on the device and a detected movement of the device. Further to these implementations, enabling the second subgroup of microservices can comprise enabling the mobility management function as a microservice that comprises a mobility management microservice. A session management microservice is not enabled.

Figure 6:
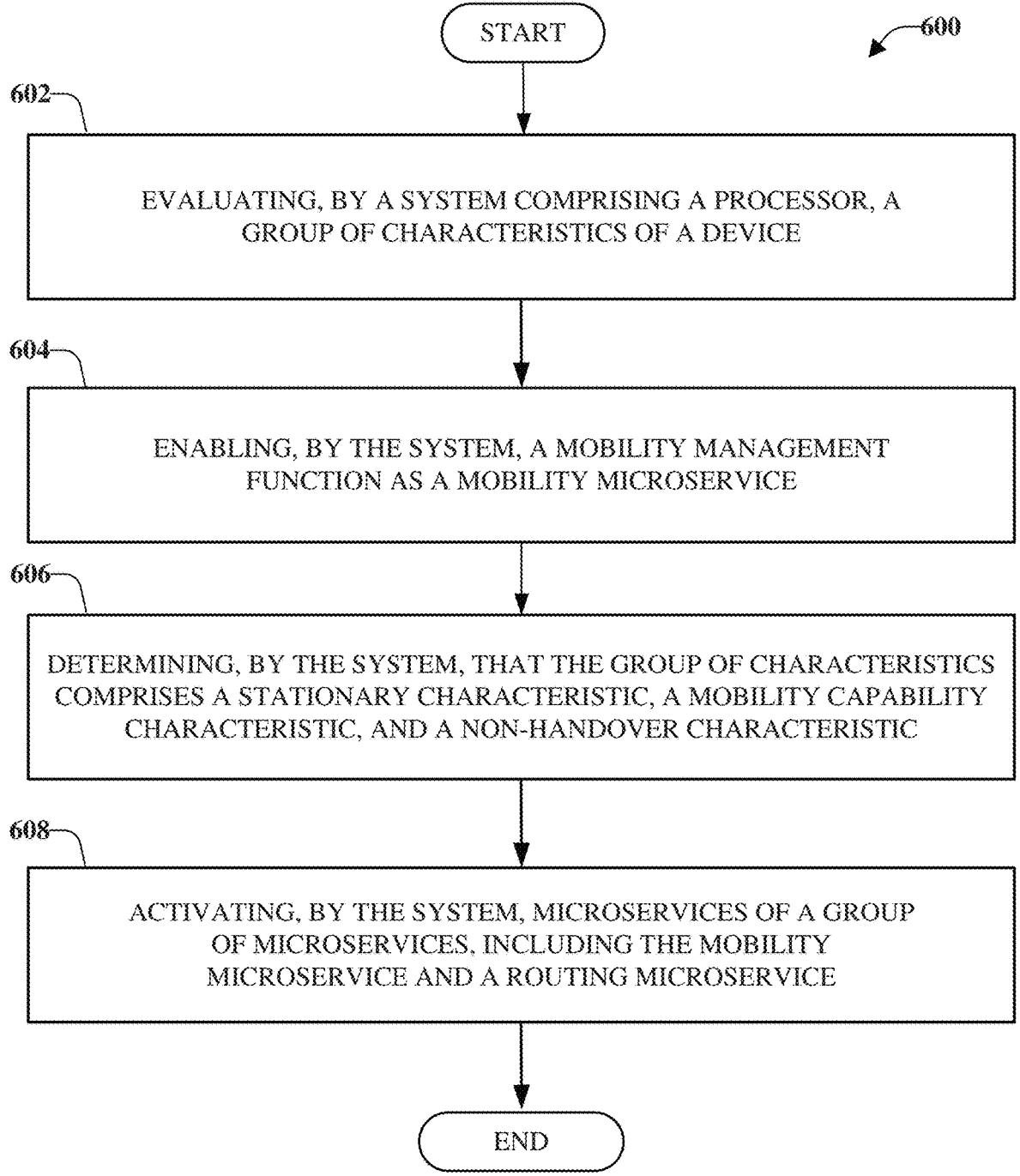
FIG. 6 illustrates a flow diagram of an example, non-limiting, computer-implemented method for facilitating mobility as a service for a stationary device in advanced networks in accordance with one or more embodiments described herein.

FIG. 6 illustrates a flow diagram of an example, non-limiting, computer-implemented method 600 for facilitating mobility as a service for a stationary device in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a system comprising a processor can evaluate a group of characteristics of a device. The group of characteristics of the device can comprise, for example, a stationary characteristic and a mobility capability characteristic that indicates the device is capable of movement. The group of characteristics can also comprise a non-handover characteristic that indicates a handover event will not be triggered based on the stationary characteristic of the device, a temporary condition of the device, and/or a handover characteristic that indicates a handover event trigger.

The system can, at 604 of the computer-implemented method 600, enable a mobility management function as a mobility microservice. According to some implementations, a mobility management function of a wireless network can be abstracted and provided on top of a wireless technology as a delivery means to provide services to the end device.

Further, at 606, the system can determine that the group of characteristics comprises a stationary characteristic of the device, a mobility capability characteristic that indicates the device is capable of movement, and a non-handover characteristic that indicates a handover event will not be triggered based on the stationary characteristic of the device.

Microservices of a group of microservices can be activated by the system at 608 of the computer-implemented method 600. The group of microservices can include the mobility microservice and a routing microservice. Further to this implementation, since the device is not considered "mobile," other microservices of the group of microservices do not need to be activated for the device.

It is noted that the stationary condition of the device can be a temporary condition. For example, a device could be sitting on a night stand and not being moved during the night while a user is sleeping. Thus, while the device is on the nightstand, the device is considered to be stationary. However, in the morning, the user goes to work and takes the device with her. Upon or after the device is moved and a handover event is expected to be triggered, the device can be treated as a mobile device for purposes of activating the microservices, as will be discussed with respect to the figure below.

Figure 7:
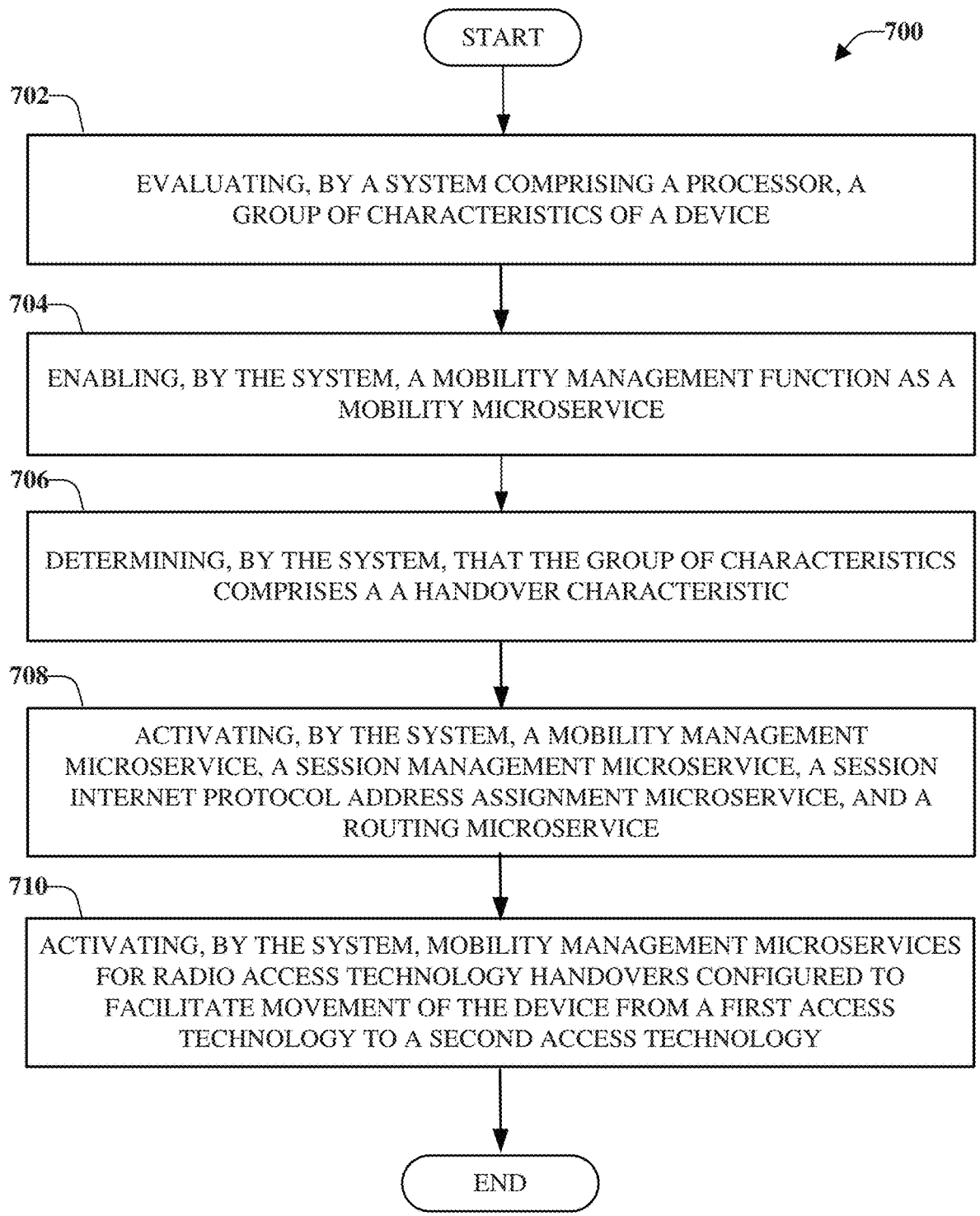
FIG. 7 illustrates a flow diagram of an example, non-limiting, computer-implemented method for facilitating mobility as a service for a device that is in motion in advanced networks in accordance with one or more embodiments described herein.

FIG. 7 illustrates a flow diagram of an example, non-limiting, computer-implemented method 700 for facilitating mobility as a service for a device that is in motion in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a system comprising a processor can evaluate a group of characteristics of a device. The group of characteristics of the device can comprise, for example, a stationary characteristic, a mobility capability characteristic that indicates the device is capable of movement, a non-handover characteristic that indicates a handover event will not be triggered based on the stationary characteristic of the device, a temporary condition of the device, and/or a handover characteristic that indicates a handover event trigger.

The system can, at 704 the computer-implemented method 700, enable a mobility management function as a mobility microservice. According to some implementations, a mobility management function of a wireless network can be abstracted and provided on a top wireless technology as a delivery means to provide services to the end device.

Further, at 706, the system can determine that the group of characteristics comprises a handover characteristic that indicates a handover event trigger. Thus, at 708, the system can activate a mobility management microservice, a session management microservice, a session internet protocol address assignment microservice, and a routing microservice. Further, at 708 of the computer-implemented method, the system can activate mobility management microservices for radio access technology handovers configured to facilitate movement of the device from a first access technology to a second access technology. According to some implementations, the session management microservice can be configured to facilitate an association between a virtual internet protocol address and a physical internet protocol address of the device.

Figure 8:
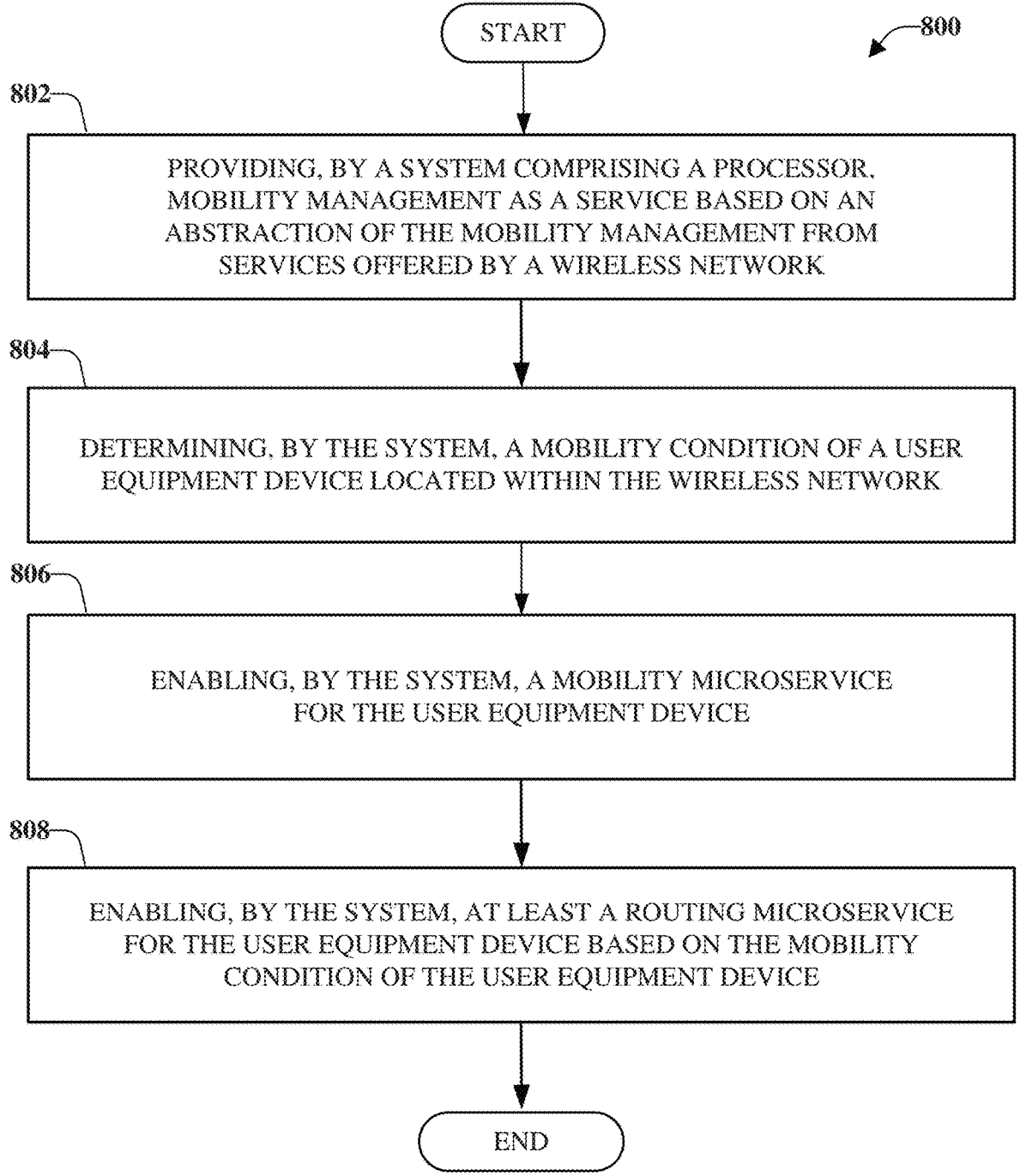
FIG. 8 illustrates a flow diagram of an example, non-limiting, computer-implemented method for facilitating selective activation of microservices to improve overall network efficiency and conserve network resources in advanced networks in accordance with one or more embodiments described herein.

FIG. 8 illustrates a flow diagram of an example, non-limiting, computer-implemented method 800 for facilitating selective activation of microservices to improve overall network efficiency and conserve network resources in advanced networks in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

At 802 of the computer-implemented method 800, a system comprising a processor can provide mobility management as a service based on an abstraction of the mobility management from services offered by a wireless network. Further, at 804 the system can determine a mobility condition of a user equipment device located within the wireless network.

A mobility microservice can be enabled for the user equipment device, at 806. Further, at least a routing microservice can be enabled for the user equipment device, at 808, based on the mobility condition of the user equipment device.

According to some implementations, the mobility condition of the user equipment device is a static condition that does not trigger a handover event. Further to these implementations, only the mobility microservice and the routing microservice are enabled based on the static condition.

In accordance with some implementations, the mobility condition of the user equipment device is a mobile condition that will trigger a handover event. In these implementations, the computer-implemented method can comprise enabling a session management microservice and a session internet protocol address assignment microservice. The method can also include enabling radio access technology configured to facilitate movement of the user equipment device from a first access technology to a second access technology. Accordingly, microservices are only activated when needed, which can conserve resources and improve network efficiency.

Described herein are systems, methods, articles of manufacture, and other embodiments or implementations that can facilitate mobility as a service in advanced networks. Facilitating mobility as a service can be implemented in connection with any type of device with a connection to the communications network (e.g., a mobile handset, a computer, a handheld device, etc.) any Internet of things (IoT) device (e.g., toaster, coffee maker, blinds, music players, speakers, water meter, etc.), and/or any connected vehicles (e.g., cars, airplanes, boats, space rockets, and/or other at least partially automated vehicles (e.g., drones), and so on).

In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and $N_r$ denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
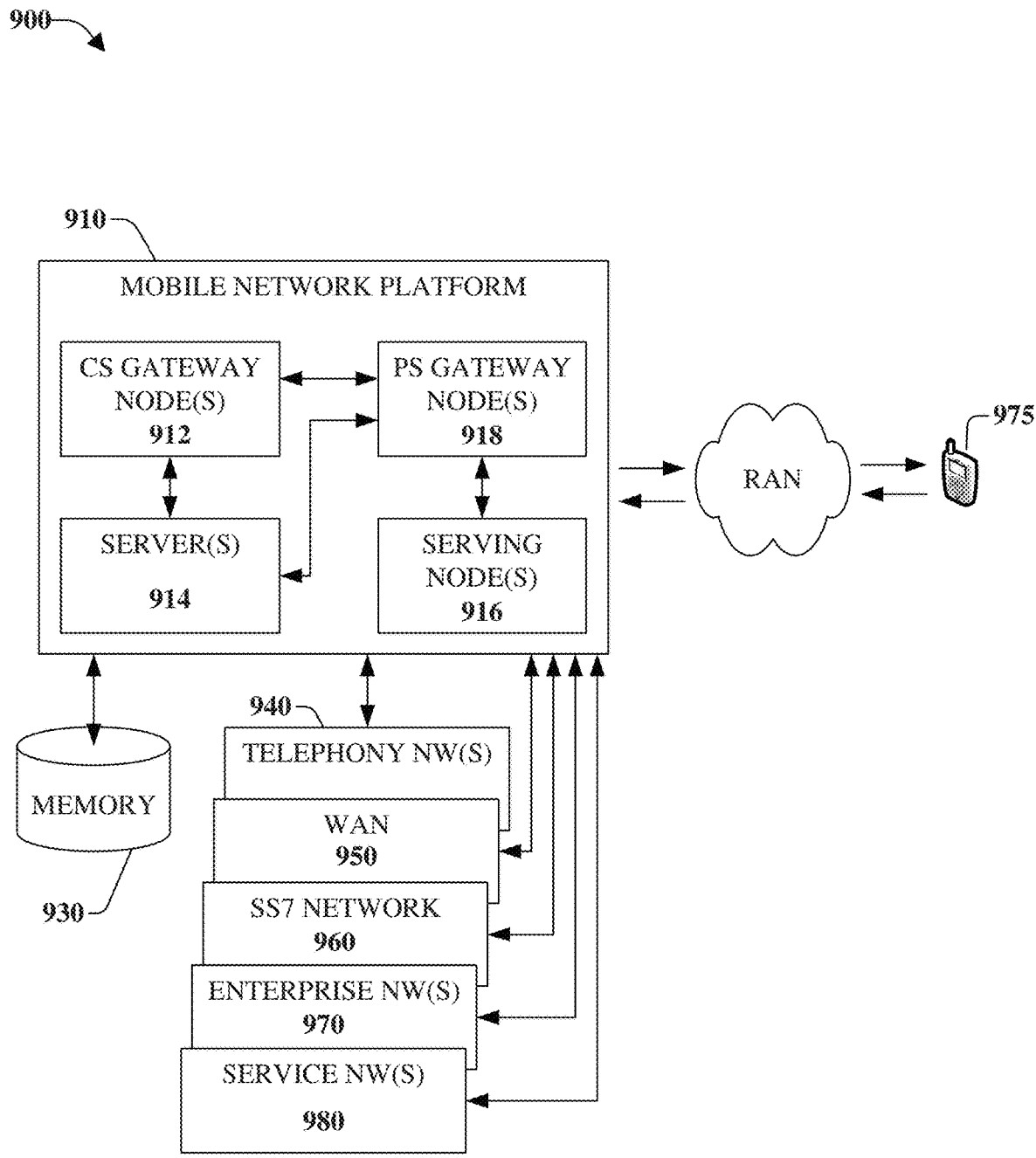
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks such as telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) such as IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
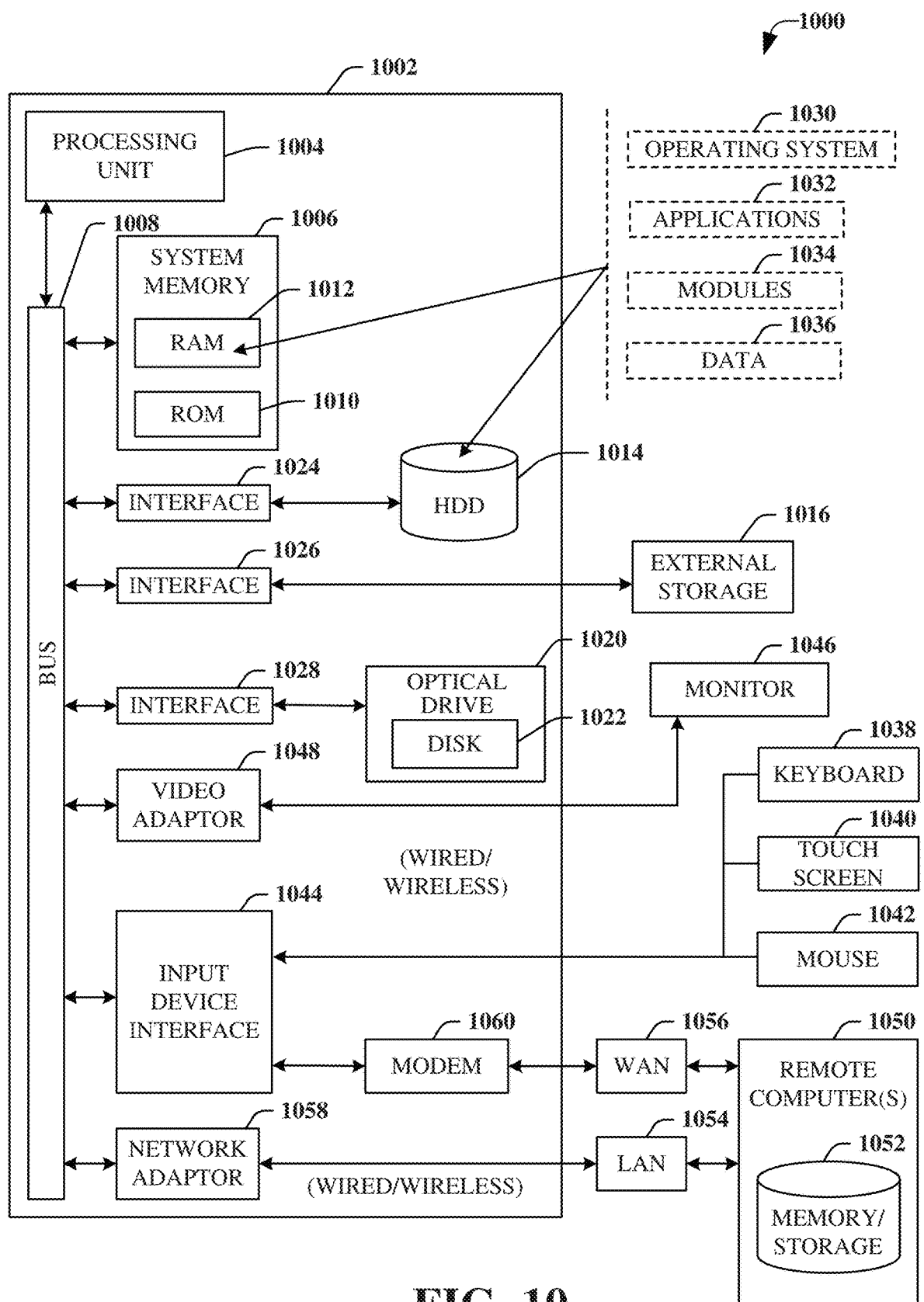
FIG. 10 illustrates an example block diagram of an example computer operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A system, comprising:
 a processor; and
 a memory that stores executable instructions that, when executed by the processor, facilitate performance of operations, comprising:
  disabling a mobility management function of a network, wherein the mobility management function is a service included in a group of services offered by the network;
  enabling the mobility management function as the service for a device within the network; and
  performing an action from a group of actions, the group of actions comprising:
   enabling a first subgroup of microservices for the device, wherein the first subgroup of microservices is selected from the group of services based on a condition of the device satisfying a first condition; or
   enabling a second subgroup of microservices for the device, wherein the second subgroup of micros- ervices is selected from the group of services based on the condition of the device satisfying a second condition,
wherein the second condition comprises an application executing on the device and a detected movement of the device,
wherein the application updates with a frequency that is less than a defined frequency threshold,
wherein the enabling of the second subgroup of microservices comprises enabling the mobility management function as a microservice that comprises a mobility management microservice, and
wherein a session management microservice is not enabled.

2. The system of claim 1, wherein the first condition comprises a stationary configuration of the device, and wherein the enabling of the first subgroup of microservices comprises:
enabling the mobility management microservice; and
enabling a routing micro service.

3. The system of claim 2, wherein the device is classified as an internet-of-things device.

4. The system of claim 2, wherein the stationary configuration of the device is determined not to trigger a handover event.

5. The system of claim 1, wherein the second condition comprises a mobility capability and the detected movement of the device, and wherein the enabling of the second subgroup of microservices comprises:
enabling the mobility management microservice, the session management microservice, a session internet protocol address assignment microservice, and a routing microservice.

6. The system of claim 5, wherein the session management microservice is configured to facilitate an association between a virtual internet protocol address and a physical internet protocol address of the device.

7. The system of claim 5, wherein the enabling of the second subgroup of microservices further comprises:
enabling mobility management microservices for radio access technology handovers configured to facilitate movement of the device from a first access technology to a second access technology.

8. The system of claim 1, wherein the second condition comprises an expected handover of the device from a neighbor network device of a neighbor network to a network device of the network.

9. The system of claim 1, wherein the application that updates with the frequency is a first application that updates with a first frequency, and wherein the first condition comprises a second application, which updates with a second frequency that is more than the defined frequency threshold, executing on the device and the detected movement of the device.

10. The system of claim 1, wherein the operations further comprise:
enabling the mobility management function as a service overlaid on a multitude of networks.

11. A method, comprising:
evaluating, by a system comprising a processor, a group of characteristics of a device;
disabling, by the system, a mobility management function of a network, wherein the disabling comprises overlaying the mobility management function, as a microservice, on a multitude of networks, and wherein the mobility management function is included in a group of microservices offered via the network;
enabling, by the system, the mobility management function as the microservice via the network; and
activating, by the system, microservices of a group of microservices, comprising the microservice, based on the group of characteristics of the device.

12. The method of claim 11, wherein the activating of the microservices of the group of microservices comprises activating a routing microservice based on a determination that the group of characteristics comprises a stationary characteristic of the device.

13. The method of claim 12, wherein the group of characteristics further comprises a mobility capability characteristic that indicates the device is capable of movement and a non-handover characteristic that indicates a handover event will not be triggered based on the stationary characteristic of the device.

14. The method of claim 12, wherein the stationary characteristic is a temporary condition of the device.

15. The method of claim 11, wherein the group of characteristics comprises a handover characteristic that indicates a handover event trigger, and wherein the activating of the microservices of the group of microservices comprises:
activating a mobility management microservice, a session management microservice, a session internet protocol address assignment microservice, and a routing microservice; and
activating mobility management microservices for radio access technology handovers configured to facilitate movement of the device from a first access technology to a second access technology.

16. The method of claim 15, wherein the session management micro service is configured to facilitate an association between a virtual internet protocol address and a physical internet protocol address of the device.

17. A non-transitory machine-readable medium, comprising executable instructions that, when executed by a processor, facilitate performance of operations, comprising:
providing mobility management as a service based on an abstraction of the mobility management from services offered by a network;
determining a mobility condition of a user equipment device located within the network;
disabling the mobility management, wherein the disabling comprises overlaying the mobility management, as a microservice, on a multitude of networks, and wherein the mobility management is included in the services offered by the network;
enabling a mobility microservice for the user equipment device; and
enabling at least a routing microservice for the user equipment device based on the mobility condition of the user equipment device.

18. The non-transitory machine-readable medium of claim 17, wherein the mobility condition of the user equipment device is a static condition that does not trigger a handover event, and wherein only the mobility microservice and the routing microservice are enabled based on the static condition.

19. The non-transitory machine-readable medium of claim 17, wherein the mobility condition of the user equipment device is a mobile condition that will trigger a handover event, and wherein the operations further comprise:
enabling a session management microservice and a session internet protocol address assignment microservice; and enabling radio access technology configured to facilitate movement of the user equipment device from a first access technology to a second access technology.

20. The method of claim 11, wherein a characteristic of the group of characteristics of the device comprises an application executing on the device and a detected movement of the device, wherein the application updates with a frequency that is less than a defined frequency threshold, and wherein the activating of the microservices comprises:
  enabling the mobility management function, wherein a session management microservice is not enabled.

* * * * *